United States Patent
Schwarze et al.

(10) Patent No.: US 6,257,370 B1
(45) Date of Patent: Jul. 10, 2001

(54) PROCESS FOR DIVIDING A VISCOUS LIQUID CONVEYED BY A FLOW OF GAS

(75) Inventors: Herrmann Schwarze, Heiligenhaus; Alexander Rebs, Ratingen-Lintorf, both of (DE)

(73) Assignee: REBS Zentralschmiertechnik GmbH, Ratingen (DE)

(*) Notice: Subject to any disclaimer, the term of this patent is extended or adjusted under 35 U.S.C. 154(b) by 0 days.

(21) Appl. No.: 09/194,007
(22) PCT Filed: May 14, 1997
(86) PCT No.: PCT/EP97/02452
  § 371 Date: Jun. 14, 1999
  § 102(e) Date: Jun. 14, 1999
(87) PCT Pub. No.: WO97/46825
  PCT Pub. Date: Dec. 11, 1997

(30) Foreign Application Priority Data

Jun. 4, 1996 (DE) .............................. 196 22 379

(51) Int. Cl.[7] ....................................... F16N 7/34
(52) U.S. Cl. .................. 184/55.1; 184/6.26; 239/464; 239/490; 239/499; 239/548
(58) Field of Search .................... 184/6.26, 7.3, 184/8, 55.1, 55.2; 239/464, 490, 499, 548, 553, 553.3, 553.5, 589, 590, 590.3, 590.5, 399

(56) References Cited

U.S. PATENT DOCUMENTS

| | | | |
|---|---|---|---|
| 3,052,318 | | 9/1962 | Thomas . |
| 3,241,635 | * | 3/1966 | Malec .................................. 184/55.2 |
| 4,353,435 | * | 10/1982 | Abrams et al. ...................... 184/55.2 |
| 4,359,141 | * | 11/1982 | Schnell ................................ 184/6.26 |
| 4,828,178 | * | 5/1989 | Tucker et al. ........................ 239/553 |
| 5,125,582 | * | 6/1992 | Surjaatmadja et al. .............. 239/499 |
| 5,253,733 | * | 10/1993 | Miyachi ............................... 184/55.1 |
| 5,715,975 | * | 2/1998 | Stern et al. ......................... 222/402.1 |
| 5,732,885 | * | 3/1998 | Huffman .............................. 239/548 |

FOREIGN PATENT DOCUMENTS 40 39 169 A1    7/1919   (DE) .

\* cited by examiner

Primary Examiner—David A. Bucci
Assistant Examiner—Chong H. Kim
(74) Attorney, Agent, or Firm—Proskauer Rose LLP

(57) ABSTRACT

An apparatus for subdividing a viscous liquid conveyed by a gas flow into a plurality of component flows has first and second connecting elements aligned within a tubular casing. The first connecting element has an inflow bore which branches into a number of discharge bores. The inflow bore discharges into a distributing chamber which widens along the direction of flow. The distributing chamber terminates in a rebound face which is aligned concentrically with the inflow bore. The rebound face has inlet openings along a periphery thereof which lead into the discharge bores, which carry the component flows. The first and second connecting elements and tubular casing may be mounted on a body.

14 Claims, 2 Drawing Sheets

PROCESS FOR DIVIDING A VISCOUS LIQUID CONVEYED BY A FLOW OF GAS

Figure 1:
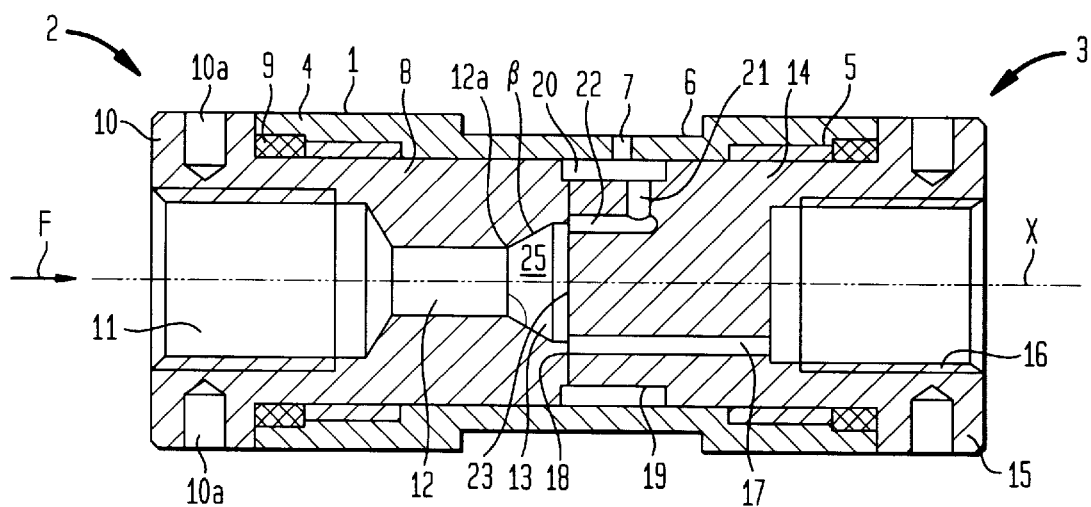

The invention relates to an apparatus for the division of a viscous liquid conveyed by means of a gas flow into a plurality of component flows, having an inflow bore, which branches into a plurality of discharge bores. Apparatuses of the kind specified are used, for example, in the lubrication system of rolling mills or rail vehicles. Conventionally an oil meeting the particular requirements is conveyed as the lubricant by means of an air flow.

Due to a turbulent gas flow directed coaxially of the course of the lines, lubricant forms on the walls of the lines of such lubricated system a thin film which has an even, undulating structure. Due to the friction between the adjoining boundary layers of air and lubricant and also the impingement of the air flow on the wave crests, this film of lubricant is driven forwards without the air becoming mixed with the lubricant. The main advantage of such conveying of lubricant to the places for lubrication is that even very small quantities of lubricant can be conveyed independently of position, more particularly unaffected by gravity.

In view of the technical expense of lines to build up a distributing system of the aforexplained kind, there is a need to convey the required total quantity of lubricant via a single supply line to close to the lubricating places and to distribute said total quantity to a corresponding number of component flows corresponding to the particular lubricating places only shortly before they are reached. To this end European Patent 0 010 269 (79103935) suggests dividing the total flow of air and lubricant by making the supply line discharge into a cylindrical distributing chamber which has a plurality of symmetrically disposed discharge bores formed in its peripheral surface. According to this citation, the effect of gravity is compensated by the symmetrical subdivision of the discharge bores.

The prior art distributing device has not lived up to expectations, since practical tests have shown considerable fluctuations of the volume of the component flows flowing into the discharge bores. It was found that in spite of considerable technical expenditure, the uniform maintenance of the turbulent flow required for proper conveying in all the supply and discharge channels can only be approximately achieved. Moreover with the prior art apparatus there is the problem that due to the large overall space required for its production, it is very difficult to incorporate, more particularly subsequently in existing installations.

Starting from the aforeexplained prior art, it is an object of the invention to provide a distributing device by means of which at low cost the air/lubricant flow can be uniformly distributed unaffected by influences of gravity, while maintaining a turbulent flow in all the discharge bores, and which is suitable to be assembled in a problem-free manner, more particularly subsequently in existing installations.

SUMMARY OF THE INVENTION

This problem is solved with an apparatus of the kind specified by the features that the inflow bore discharges into a distributing chamber widening in the direction of flow; a circularly extending tear-off edge is provided in the zone of the transition from the inflow bore to the distributing chamber; and structured on the wall of the distributing chamber opposite the end of the inflow bore is a rebound face which is aligned concentrically of the end opening of the inflow bore valve and whose diameter is larger than the diameter of the inflow bore and around whose periphery the inlet openings of the discharge bores are exposed distributed; and that it has a tubular casing, each of whose end faces is formed with a receptacle, the first of which is adapted to receive an inflow side connecting element and the second to receive a second connecting element.

According to the invention the turbulent gas flow flowing in the supply line is aligned on a rebound face positioned at the end of a funnel-shaped distributing chamber. The discharge bores are disposed around the rebound face. The gas flowing into the distributing chamber and impinging on the rebound face first forms thereon a radially redirected rebound flow, the main proportion of which is deflected into a sheath flow opposite to the entry flow. The remaining part of the gas flow penetrates in equal proportions into the discharge bores.

As a result of the sheath flow, first the viscous liquid flowing out of the inflow bore is dammed in the zone of the distributing chamber inlet, thus preventing its uncontrolled stria-like entry. The gas flow continuously flowing into the distributing chamber zone entrains liquid droplets from the damming zone. The liquid droplets impinge with the gas flow on the rebound face and are driven thereon in the direction of the discharge bores.

Since the energy of the gas flow entering the distributing chamber is available to a substantially unchanged extent for the damming of the liquid and also the movement of the liquid on the rebound face to the discharge bores is produced by the high-energy radially directed rebound flow, influences of gravity no longer play any part in the apparatus according to the invention. As a result, the distributing apparatus according to the invention can be mounted in any required position of incorporation with an unchanged satisfactory distributing result.

If the apparatus according to the invention is also equipped with a tubular, cylindrical casing, the apparatus can be inserted in a problem-free manner into a suitably dimensioned bore which can also be used for the protected extension of the supply and discharge lines. In this way the apparatus according to the invention can even be mounted at otherwise difficultly accessible or spatially limited places in a fairly large installation. Thus, for example, rolling mills or similar installations can also be equipped subsequently without great difficulties with the apparatuses according to the invention.

An apparatus according to the invention which is simple to produce by manufacturing techniques is characterised in that the distributing chamber is constructed conical and the rebound face flat and circular, and the diameter of the rebound face corresponds to a multiple of the diameter of the inflow bore.

A considerable enhancement of the uniformity with which the fluid is distributed to the discharge bores can be achieved by the feature that a sharp-edged throttling place is constructed in the zone of the transition from the rebound face to the discharge bores. This allows the preclusion of any effect of the flow resistances of the lines following the discharge bores, something which can be achieved by adjusting the throttling resistance higher than the maximum flow resistance of the lines. The exclusion of the effect of even the flow resistance of the lines ensures that the flows in the particular lines adjoining the discharge bores always remain stable independently of quantity and pressure.

With a view to a uniform division of the liquid, also advantageously the centres of the inlet openings of the discharge bores are disposed at regular intervals on a circle. With such a construction, moreover, a throttling place can be obtained in a simple manner by the feature that the diameter of the circle corresponds to the maximum diameter of the distributing chamber. In this case some of the discharge bores are covered by the end face edge of the distributing chamber wall, so that a sharp-edged throttling place is formed in the zone of the marginal edge.

Also advantageously in connection with the uniform entry of liquid into inlet bores, the discharge bores are constricted. Immediately downstream of such waisting a vacuum is formed which is advantageous for the regular entry of liquid in droplets into the discharge bores.

As regards the release of the gas flow from the liquid flow on entry into the distributing chamber, advantageously the conical face of the distributing chamber is angled in relation to its longitudinal axis by an angle of 30° to 90°, more particularly 60°.

A favorable effect can also be exerted on the inflow of liquid into the discharge bore by the feature that the width of each web remaining between two adjacent discharge bores is reduced to a minimum.

As regards the design of the casing of the apparatus according to the invention, advantageously the inflow bore is formed in the inflow side connecting element and the widening portion of the distributing chamber is formed in that one of its end faces which in the incorporated state is disposed in the casing.

Also advantageously the rebound face and the discharge bores are constructed on a distributing member insertable into the casing. This applies more particularly if the distributing member and the second connecting element are constructed unitarily. With such a construction the distributing apparatus according to the invention can be made up of only three essential parts.

Figure 2:
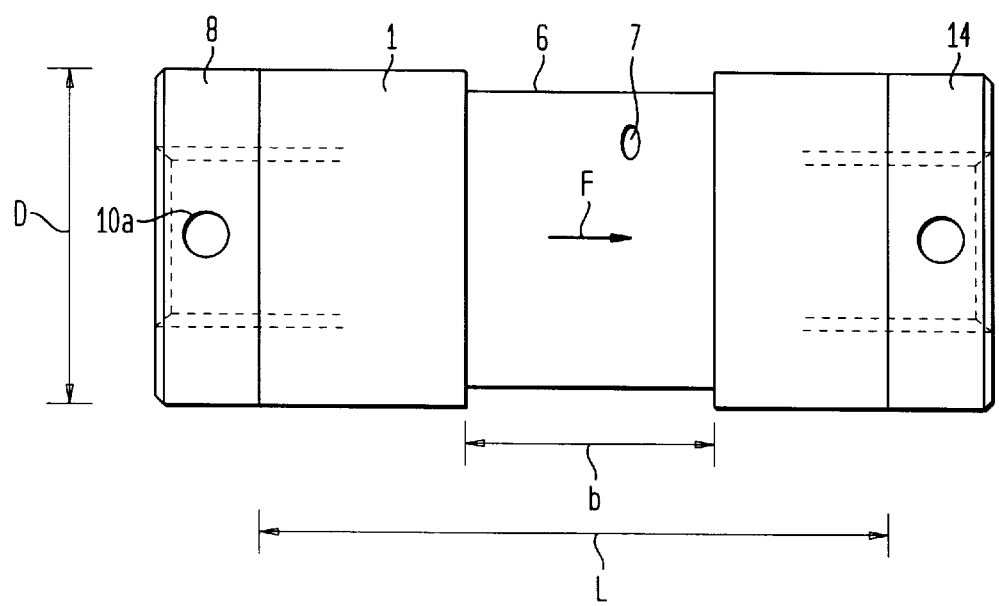
Figure 3:
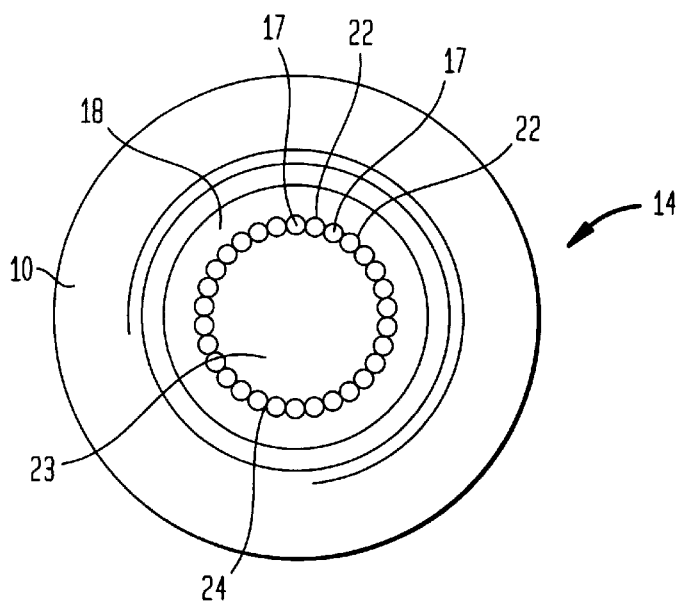
Figure 4:
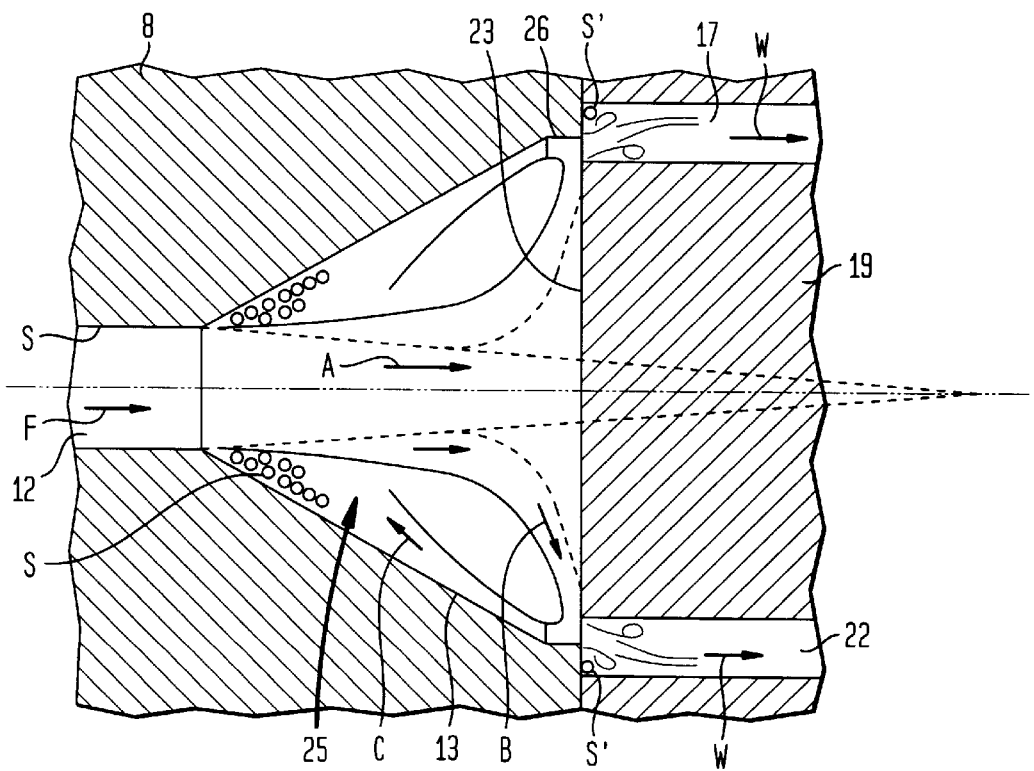

An embodiment of the invention will now be explained in greater detail with reference to the drawings, which show:

FIG. 1 an axial longitudinal section through a first embodiment of an apparatus for distributing a lubricant conveyed by an air flow, FIG. 2 a plan view of the apparatus shown in FIG. 1, FIG. 3 a front view of a connecting element used in the apparatus shown in FIGS. 1 and 2, and FIG. 4 a partially sectioned view on an enlarged scale of a distributing chamber of the apparatus shown in FIGS. 1–3.

DETAILED DESCRIPTION OF THE INVENTION

The apparatus shown in FIG. 1 has a cylindrical, tubular casing 1. Starting from the inflow side end face 2 and the discharge side end face 3 of the casing 1, receptacles 4, 5 taking the shape of internal threadings are formed in the internal bore of the casing 1. In its central portion the casing 1 has a circularly extending groove 6 whose width b corresponds approximately to one third of the length L of the casing 1. The radially directed bore 7 connects the groove 6 to the interior of the casing 1.

A first inflow side connecting element 8 is screwed into the first receptacle of the casing 1. An O-ring seal 9 seals the opening of the casing 1 associated with the connecting element 8 off from the surroundings. The connecting element 8 has a head plate 10 whose diameter corresponds to the maximum diameter D of the casing 1. Formed in the peripheral face of the head plate 10 are blind bores 11 which are used for the application of an assembly tool (not shown).

Formed in the inflow side end face of the connecting element 8 is a threaded bore 11 to which a connecting nipple (not shown) of an inflow line (not shown) can be screwed.

The threaded bore 11 discharges into an inflow bore 12. The inflow bore 12 discharges into a funnel 13 which, starting from the end face of the connecting element 8 which is situated in the casing 1 in the incorporated state, is formed in said connecting element 8. At the same time a sharp tear-off 12a is formed between the end of the inflow bore 12 and the entry of the funnel 13. The diameter of the funnel 13 widens in the direction of flow F, its conical faces being angled at an angle β of 60° in relation to the longitudinal axis X.

A second connecting element 14 is screwed into the discharge side receptacle 5 of the casing. The connecting element 14 also has a head plate 15 whose diameter is equal to the maximum diameter D of the casing 1. Starting from the discharge side end face of the first connecting element 8, formed in the connecting element 14 coaxially with the threaded bore 11 is a threaded bore 16 to which a connecting nipple (not shown) of a first discharge line (not shown) can be screwed. A plurality of discharge bores 17 extending axis-parallel with the longitudinal axis X of the casing 1 connect the end face 18 of the connecting element 14 disposed in the casing 1 in the incorporated state to the threaded bore 16. The front portion 19 of the connecting element 14 has a diameter which is reduced in comparison with the diameter of the casing internal bore, so that with the connecting element 14 incorporated, an annular channel 20 is formed between the wall of the casing 1 and the front portion 19 of the connecting element 14. The channel 20 is connected to the groove 6 via the bore 7.

In the annular channel 20 radially directed portions 21 discharge of discharge bores 22 which, starting from end face 18 of the connecting element 14, first extend coaxially with the longitudinal axis X, until they impinge on the radially directed portions 21. The inlet openings of the discharge bores 22 are disposed in alternating series with the entry openings of the discharge bores 17 on the end face of the connecting element 14. Their centers lie on a circle whose diameter corresponds to the diameter of the maximum opening of the funnel 13.

Formed concentrically with the longitudinal axis X on the end face 18 of the connecting element 14 is a flat rebound face 23 whose diameter is a multiple of the diameter of the inflow bore 12. The inlet openings of the discharge bores 17, 22 are disposed so closely adjacent one another around the rebound face 23 that the width of the webs 24 between the discharge bores 17, 22 is reduced to a minimum.

In the assembled state the end wall 18 of the connecting element 14 bears tightly against the corresponding end wall of the connecting element. The funnel 13 co-operates with the end wall 18 of the connecting element 14 to form a distributing chamber 25, which airflow A used for example as the conveying medium enters at high velocity. Nitrogen may also be used as the conveying medium. The airflow A impinges on the rebound face 23, where it is deflected into a radially directed rebound flow B. The rebound flow B is taken by the conical faces of the funnel 13 in the form of a sheath flow C in the direction of the end of the inflow bore 12, so that the lubricant S is dammed which is conveyed forwards on the inner walls of the inflow bore 12. The dammed lubricant S is entrained in droplets by the afterflowing airflow A, so that the lubricant droplets impinge on the rebound face 23. On the rebound face 23 the lubricant droplets are driven radially outwards by the rebound flow B to the inlet openings of the discharge bores 17, 22. The edge 26 entering the inlet openings between the funnel 13 and the end face of the connecting element 8 forms a sharp tear-off edge. The result of the tear-off edge is that a dead zone is formed in the inlet area of the discharge bores 17, 22, lubricant droplets W collecting in said zone. After a certain quantity of lubricant S' has collected in the dead zone, the lubricant S' is conveyed along the walls of the discharge bores by airflow W entering said bores.

Half of the lubricant S thus uniformly distributed to the discharge bores 17, 22 flows via the discharge bores 17 to the threaded bore 16, while the other half flows via the discharge bores 22 to the annular channel 20 and from thence to the bore 7.

What is claimed is:

1. An apparatus which subdivides a viscous liquid conveyed by a gas flow into a plurality of component flows, comprising:

first and second connecting elements, and a tubular casing which aligns said first and second connecting elements with each other, an inflow bore which branches into a plurality of discharge bores, said viscous liquid being conveyed by said gas flow through said inflow bore and said discharge bores, said inflow bore discharging said gas flow into a distributing chamber which widens along the direction of flow, a circularly extending edge located in a transition zone between said inflow bore and said distributing chamber, said distributing chamber terminating in a rebound face which is aligned concentrically with said inflow bore, and wherein the diameter of said rebound face is larger than the diameter of said inflow bore, said rebound face having a plurality of inlet openings disposed along a periphery thereof and leading into said plurality of discharge bores which carry said component flows, and said first and second connecting elements and said tubular casing adapted to be mounted on a body.

2. The apparatus of claim 1, wherein said distributing chamber has a conical shape and said rebound face has a flat, circular shape, wherein the diameter of said rebound face is an integer multiple of the diameter of said inflow bore.

3. The apparatus of claim 1, further including a sharp edge disposed between said rebound face and said inlet openings.

4. The apparatus of claim 1, wherein said plurality of inlet openings are disposed uniformly about said periphery of said rebound face.

5. The apparatus of claim 4, wherein the diameter of said rebound face is equal to the largest diameter of said distributing chamber.

6. The apparatus of claim 2, wherein said distributing chamber widens from said inflow bore at an angle between 30° and 90°.

7. The apparatus of claim 6, wherein said angle is 60°.

8. The apparatus of claim 1, wherein said discharge bores are narrower than said inflow bore.

9. The apparatus of claim 1, wherein there is a minimum distance between two adjacent discharge bores.

10. The apparatus of claim 1, wherein groups of said discharge bores form discharge channels downstream of said rebound face in the direction of said flow.

11. The apparatus of claim 10, further comprising at least two said discharge channels.

12. The apparatus of claim 1, wherein said rebound face and said plurality of discharge bores are formed on a distributing member insertable into said casing.

13. The apparatus of claim 12, wherein said distributing member and said second connecting element comprise a unit.

14. The apparatus of claim 1, wherein said gas is nitrogen and said viscous liquid is a flowable lubricant.

\* \* \* \* \*